(12) United States Patent
Davilla et al.

(10) Patent No.: US 7,858,935 B2
(45) Date of Patent: Dec. 28, 2010

(54) METHOD AND SYSTEM FOR CONDUCTING EVENT-STREAMED SPECTRUM IMAGING

(75) Inventors: Scott David Davilla, Hillsborough, NC (US); Jayanthi Subramanian Suryanarayanan, Raleigh, NC (US)

(73) Assignee: 4Pi Analysis, Inc., Durham, NC (US)

( * ) Notice: Subject to any disclaimer, the term of this patent is extended or adjusted under 35 U.S.C. 154(b) by 263 days.

(21) Appl. No.: 11/824,036

(22) Filed: Jun. 28, 2007

(65) Prior Publication Data
US 2008/0011948 A1   Jan. 17, 2008

Related U.S. Application Data

(60) Provisional application No. 60/817,900, filed on Jun. 30, 2006.

(51) Int. Cl.
*G01N 23/00* (2006.01)

(52) U.S. Cl. .............. 250/306; 250/307; 250/309; 250/310; 250/311; 850/9; 702/33; 702/34; 702/35

(58) Field of Classification Search .......... 250/306, 250/307, 309, 310, 311; 850/9; 702/33, 702/35, 36
See application file for complete search history.

(56) References Cited

U.S. PATENT DOCUMENTS

| 5,241,181 | A | * | 8/1993 | Mertens et al. | 250/363.03 |
| 5,502,306 | A | * | 3/1996 | Meisburger et al. | 250/310 |
| 6,061,471 | A | * | 5/2000 | Coleman, Jr. | 382/173 |
| 6,072,177 | A | * | 6/2000 | McCroskey et al. | 250/252.1 |
| 6,269,144 | B1 | * | 7/2001 | Dube et al. | 378/71 |
| 2004/0104357 | A1 | * | 6/2004 | Fujiyoshi et al. | 250/491.1 |
| 2006/0013465 | A1 | * | 1/2006 | Nonaka | 382/132 |
| 2007/0158551 | A1 | * | 7/2007 | Audebert et al. | 250/306 |
| 2007/0255512 | A1 | * | 11/2007 | Delenstarr et al. | 702/35 |

* cited by examiner

*Primary Examiner*—Robert Kim
*Assistant Examiner*—Michael J Logie
(74) *Attorney, Agent, or Firm*—Ward and Smith, P.A.

(57) ABSTRACT

A method and system for conducting event-streamed spectrum imaging concurrently collects electron and spectral signals resulting from a raster scan of a sample. The signals are formatted and assembled as a packet stream. The packet stream is transmitted to a host where it is buffered, stored and processed.

18 Claims, 8 Drawing Sheets

ESSI ENVIRONMENT DIAGRAM

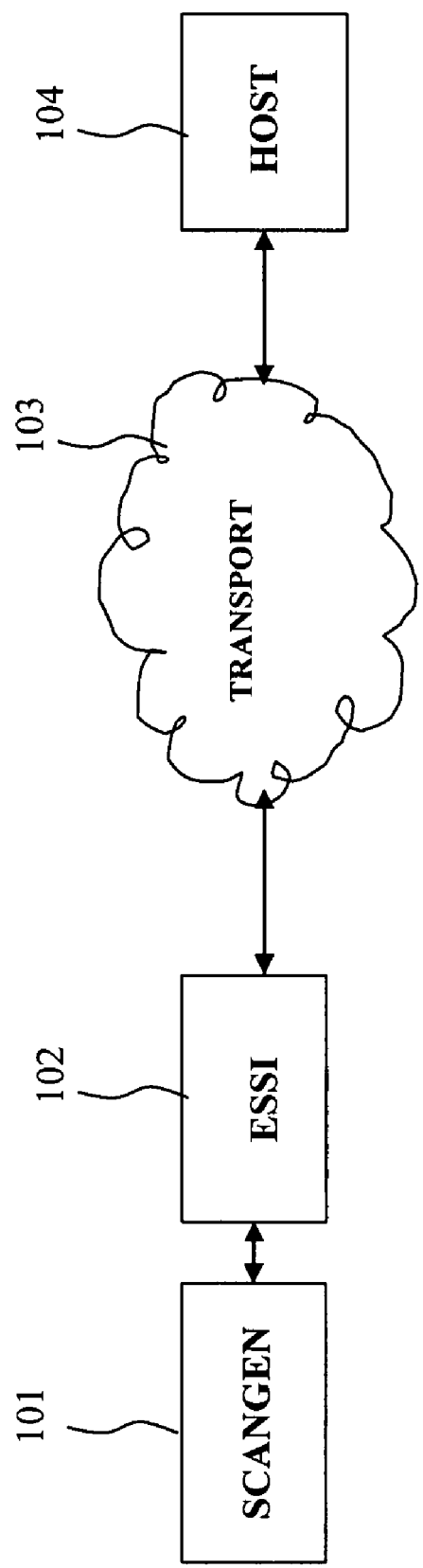
FIGURE 1: ESSI ENVIRONMENT DIAGRAM

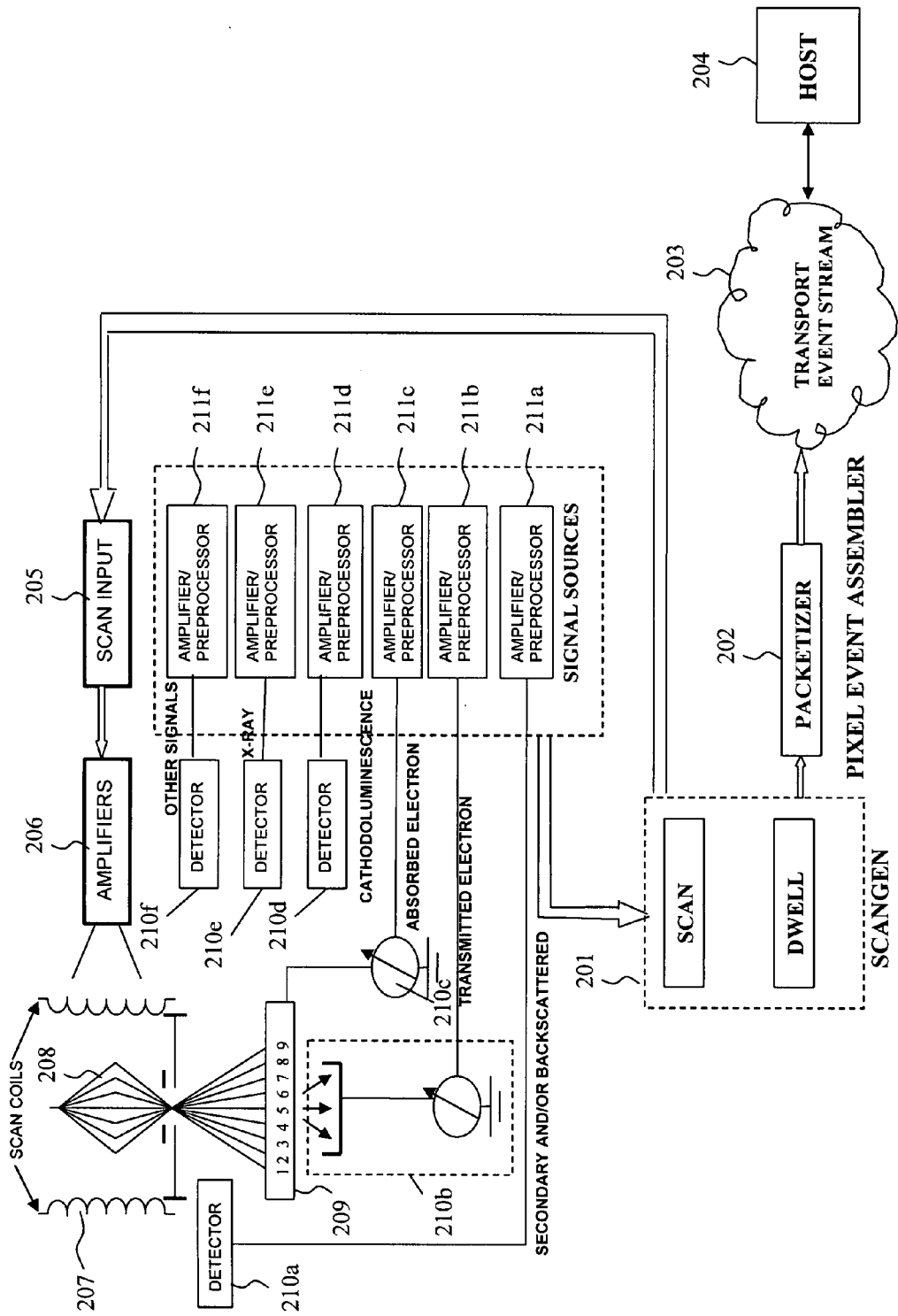
FIGURE 2: ILLUSTRATION OF CONVENTIONAL SCAN GENERATOR ON IMAGING DEVICE

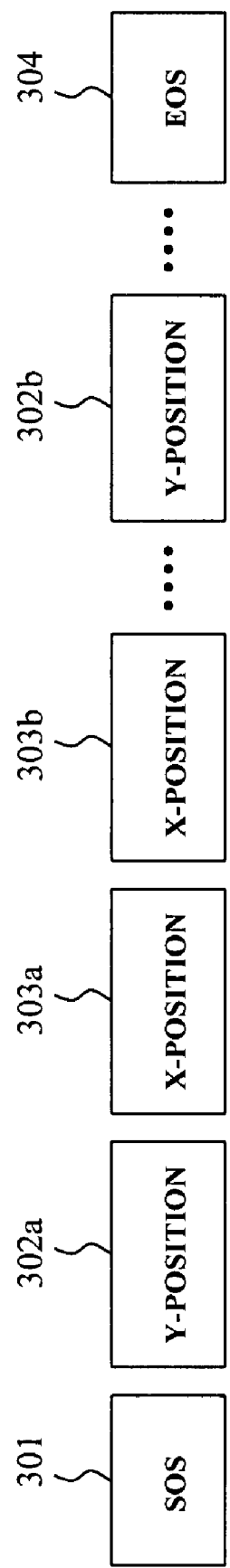
FIGURE 3: ILLUSTRATION OF ESSI PACKET FORMAT

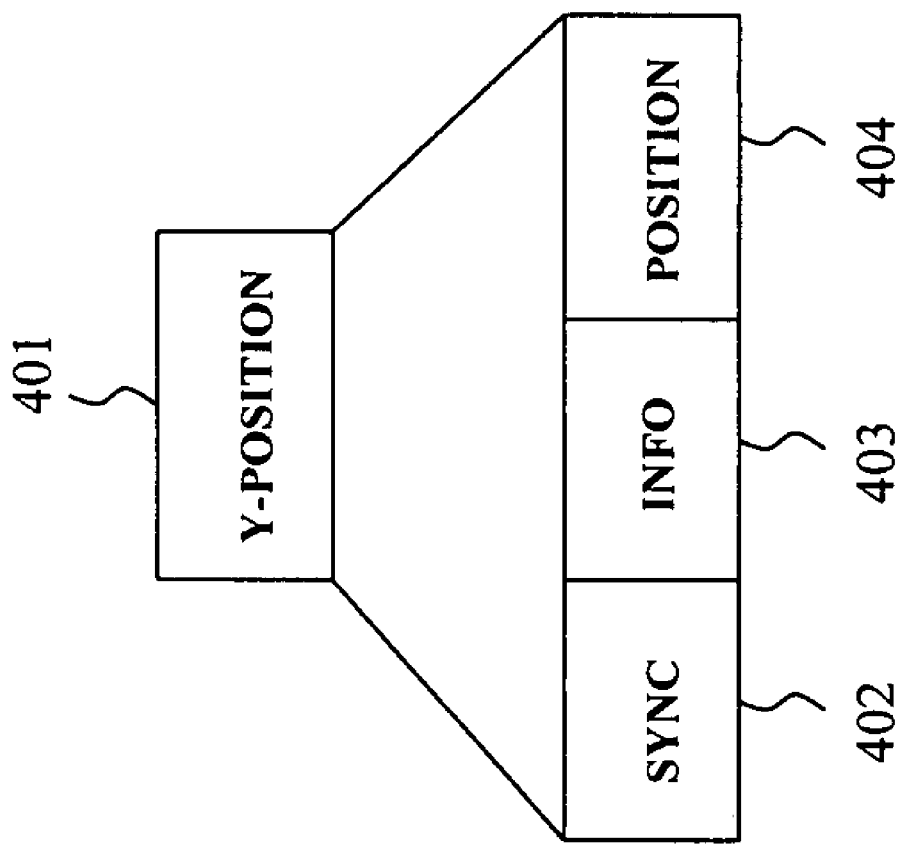
FIGURE 4: ILLUSTRATION OF Y-POSITION FORMAT

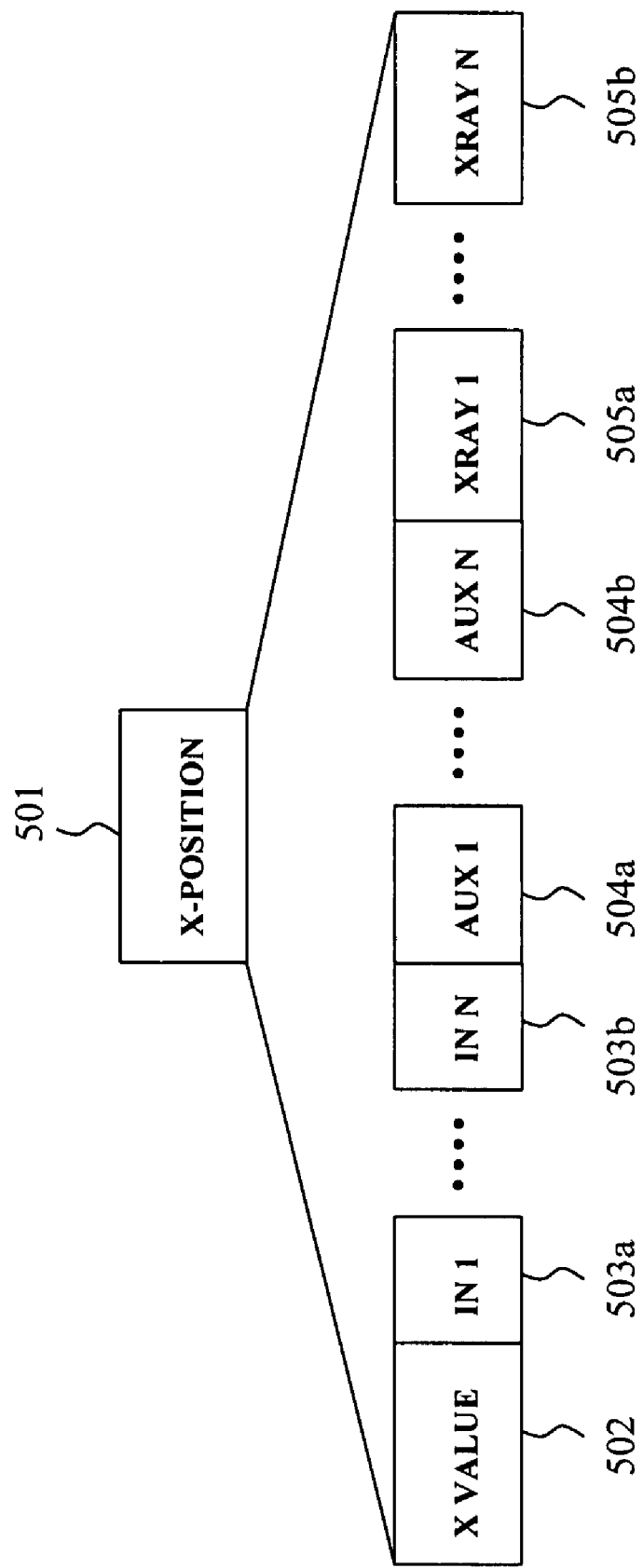
FIGURE 5: ILLUSTRATION OF X-POSITION FORMAT

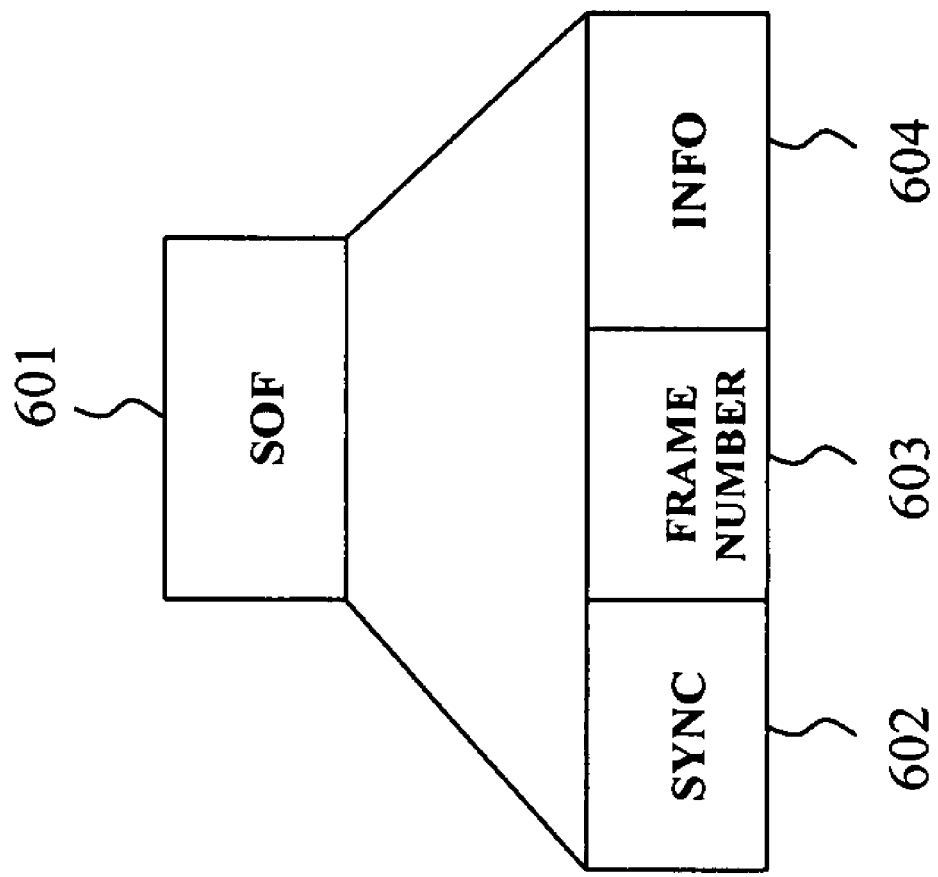
FIGURE 6: ILLUSTRATION OF SOF FORMAT

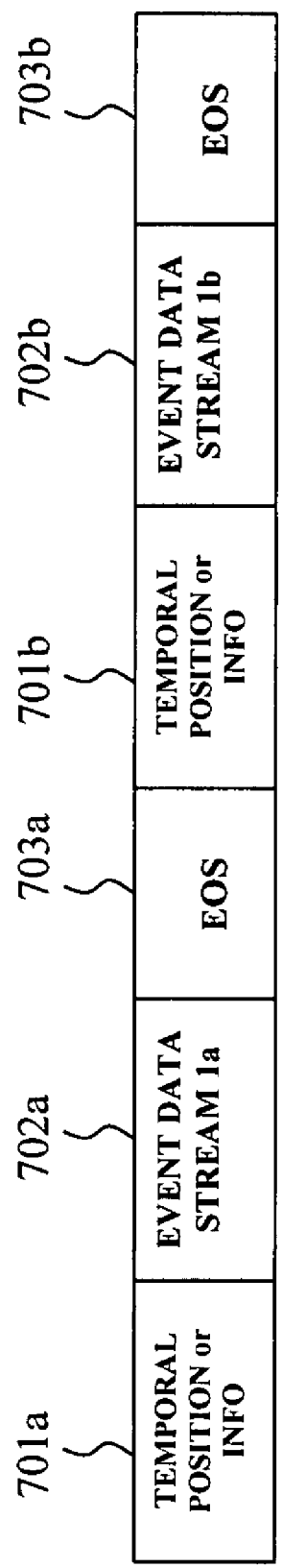
FIGURE 7: ILLUSTRATION OF ALTERNATE EVENT STREAM FORMAT

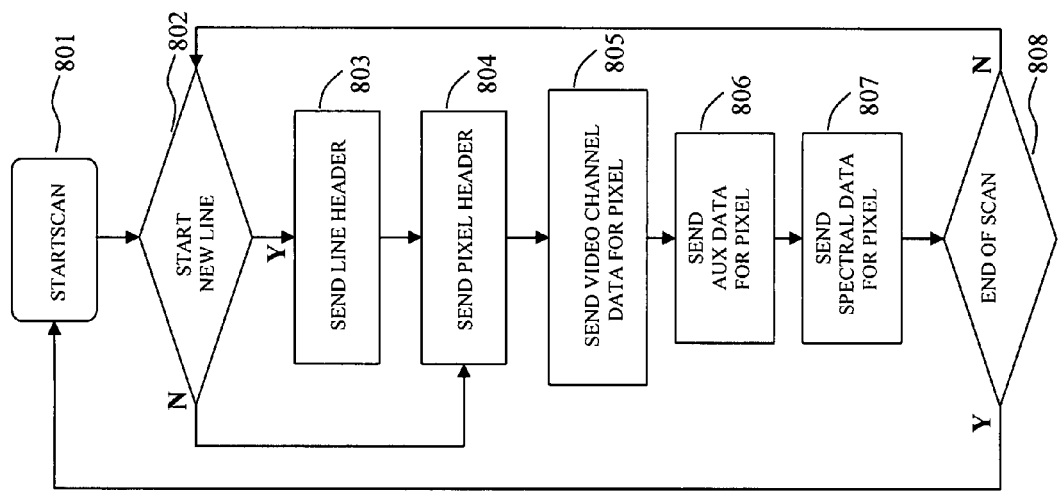
FIGURE 8: FLOW DIAGRAM TO ASSEMBLE PACKET FOR ELECTRON AND SPECTRUM IMAGING

METHOD AND SYSTEM FOR CONDUCTING EVENT-STREAMED SPECTRUM IMAGING

CROSS REFERENCE TO RELATED APPLICATION

This application is related to and claims priority to the filing date of Provisional Application Ser. No. 60/817,900 filed Jun. 30, 2006, and to the filing date thereof. That application is entitled "Method and System for Event Streamed Spectrum Imaging" of the same inventors herein. The disclosure of that application is also specifically incorporated by reference herein in its entirety.

BACKGROUND OF THE INVENTION

1. Field of the Invention

This invention relates to a method and system for conducting event-streamed spectrum imaging ("ESSI"). More particularly, this invention relates to a method and system for conducting such imaging using concurrent collection of electron and spectral signals.

2. Discussion of the Prior Art

Spectrum imaging is the collection and spatial registration of all spectral events, yielding a spectral data cube. By the term "spectral events" is meant the converted value of the measurement of a physical property of a photon or elemental particle. The physical property could be the energy of an x-ray photon, the energy of an electron, the wavelength of a light photon, the mass of an ionized atom as well as other similar physical properties. For the use in this discussion, spectral events are the converted x-ray energies from an x-ray detector/pulse processor, the value of which is proportional to the energy of the x-ray. Various analytical methods can be applied to the spectral data cube, ranging from simple elemental region-of-interest images, to spectral summation of the pixel elemental weight percent, to true chemical phase images. By the term "region-of-interest images" is meant a region defined with regard to a span of x-ray energies that corresponds to peak location of an element in an x-ray spectrum. The sum of x-ray counts over the defined energy region is collected for each pixel, creating an element image. By the term "spectral summation of the pixel elemental weight percent" is meant the summation of the x-ray spectra that correspond to pixels inside a spatially defined region of interest. The resultant x-ray spectrum can then be quantified to yield the weight percent values of the constituent elemental distribution. By the term "true chemical phase images" is meant the processing of the spectral data cube by methods such as principal components or multi-variant statistical analysis, both of which use statistical methods to transform the data into a basis where it can be visualized according to an eigenvector formulation.

Collecting a spectrum image involves scan generation which is the process of generating an x-y spatial raster scan over an area of interest using such methods of electron/ion beam scanning or specimen stage scanning. Typically, scan generation is used to collect an image from any signal where the source of the signal is converted to analog from either a backscattered or secondary electron detector, but it can be a signal from any detector (e.g., absorbed current, EBIC, or cathodoluminescence detectors) connected to the microscope. With traditional spectrum imaging, the signal source is the converted x-ray energies. The time required to collect a spectrum image is dependent on the x-ray photon flux, the amount of x-ray dwell time per pixel, the image size and the number of image frames scanned.

There are two methods in the prior art known for collecting a spectrum image. In the first method, the spectrum image is collected sequentially (Ingram et al., *Microbeam Analysis*, 1988, Hunt and Williams, *Ultramicroscopy*, 1991), that is, pixel by pixel. At each pixel position, a full spectrum of spectral events is collected for a given x-ray dwell time. Sequential spectrum imaging has a disadvantage of requiring long collection times per pixel in collecting the entire image mostly due to significant overhead in transferring a full spectrum of spectral events for each pixel.

In the second method, the spectrum image is collected using the method of position-tagged spectrometry (Legge and Hammond, *Journal of Microscopy*, 1979, Mott et al., *Proceedings Microscopy and Microanalysis*, 1995) in which spectral events are tagged with the corresponding pixel position in spatial x, y coordinates while the pixels are continually scanned. Pixels that contain no spectral events are not collected. By the term "tagged" is meant the pixel positions are passed to the spectral signal processor that performs the operation of associating the pixel position with the spectral event when the spectral event occurs.

The disadvantage of both methods is that they lack integration with scan generation and electron imaging. These methods solely focus on the collection of spectral data without attaching importance to the simultaneous inclusion of other signals of interest, such as secondary and backscattered electron signals, for a given pixel position. This does not allow viewing spectral and electron information in tandem on a display, limiting the ability to exactly associate any features or artifacts found in the spectrum image with those occurring in the electron image. Separately acquiring spectrum and electron images may reduce the reliability of information that is inferred from each other about associated features or artifacts.

A further disadvantage is that the data collected by both methods is not efficiently organized for storage or subsequent processing for display and analysis at the host. To overcome these limitations and increase the speed, accuracy and relevance of information obtained from analyzing spectrum images the method of event-streamed spectrum imaging discussed and described herein has been developed.

BRIEF SUMMARY OF THE INVENTION

The invention relates to a method and system for conducting event-streamed spectrum imaging ("ESSI"). For the sake of clarity, by the term event streamed spectrum imaging or ESSI is meant a method and system of concurrent collection of data from different signal sources such as x-ray and electron signal sources, registered to every pixel position over a single or multiple scan frames, with zero overhead. The method described herein eliminates sequential collection and analysis of these signal sources related to a pixel position, for example, backscattered electron collection for particle location followed by spectral event collection for particle identification.

In one specific aspect, the invention relates to a method for conducting event-streamed spectrum imaging. An analog x, y raster scan is generated on a sample with a scan generator to acquire an image of pixel events. A plurality of different types of signals generated by the scan from interaction with a sample are detected and converted into electronic data signals for every x, y position and scan frame from all signals generated by the scan. The electronic data signals are formatted into packets and streamed as packets over an interface to a host as an event stream. The event stream is buffered and stored in the host for use in display of and processing of information acquired about the sample.

In an alternative aspect, a system for conducting event-streamed spectrum imaging is provided. Such a system includes means for generating an x, y raster scan over an area of interest on a sample with a scan generator to acquire an image of pixel events. Detectors serve to detect a plurality of different types of signals generated by interaction of a master scan with a sample. A converter or converters serve to convert detected signals into electronic data signals for every x, y position and scan frame from all signals generated by a scan. A formatting module serves to format electronic data signals into packets and for streaming the packets over an interface to a host. The host is configured for buffering and storing an event stream for use in display of and processing of information acquired about a sample.

The system and method of the invention treats all signal sources as events that are collected by the scan generator. This includes auxiliary events such as dynamic collection parameter changes. The individual events are assembled into a structure that contains information from all the events related to a pixel position. More specifically, concurrent signal collection is synchronized to x, y scan position. Thus, collection of all the signals, e.g. electron x-ray, etc., occurs or is achieved as a function of x,y and frame in a manner not previously done in the art. As events can be collected over single or multiple frames of pixels, a frame number is included with the structure. The frame number allows the formation of a temporal component that allows the host to make decisions on how to process upcoming (future) frames in an acquired event stream based on processing performed on previous (past) frames that occurred in the same stream. The assembled information is transferred to a host for processing, display and analysis. This allows for the concurrent collection of different types of signals such as spectral signals and electron signals.

In the invention, frame information is included to gain a temporal component. A time stamp could be used in the alternative, but a frame number is simpler. The temporal component is important because it allows processing modules, described later herein, to logically make decisions on how to process upcoming events as will be readily apparent to those of ordinary skill. Further, in accordance with the invention, spatial frame lock drift correction is achieved and is possible because of the temporal component.

Independent processing modules at the host can start extracting events from the event stream without waiting for the entire stream acquisition to complete. One such module can be a storage module that simply saves the event stream. This saved stream can then be used by other processing modules thus decoupling the collection module from the processing modules. Since all information is contained in the event stream, processing modules can operate independently and efficiently. Processing modules can choose all or some portion of the event stream for display or processing. In addition, processing modules can alter analysis methods and re-analyze by replaying the saved event stream from the beginning until it catches up to the real-time event stream. This allows a high degree of interaction between the stream generation process and the host without having to restart the scan generation process The interactive analysis includes the alteration of analysis conditions through dynamic adjustment of the collection parameters. Collection parameters can include beam positioning, data collection and signal source specific parameters. Changes in parameters are embedded in the event stream enabling processing modules at the host to identify these changes and adjust their event processing decisions accordingly.

BRIEF DESCRIPTION OF THE SEVERAL VIEWS OF THE DRAWING

FIG. 1 is a schematic diagram illustrating the environment in which event-streamed spectrum imaging in accordance with the invention is conducted;

FIG. 2 is an example of a conventional scan generator used for the concurrent collection of signals from different signal sources;

FIG. 3 is a block diagram illustrating a packet structure consisting of various component formed by the method and system of the invention;

FIG. 4 is a block diagram illustration of the Y-POSITION component of the packet structure of FIG. 3;

FIG. 5 is a block diagram illustration of the X-POSITION component of the packet structure of FIG. 3;

FIG. 6 is a block diagram illustration of a proposed SOF component for the packet structure of FIG. 3;

FIG. 7 is a block diagram illustration of an alternate packet structure format;

FIG. 8 is a flow diagram illustrating the steps performed by event-streamed spectrum imaging according to a preferred embodiment of the invention.

DETAILED DESCRIPTION OF THE INVENTION

In accordance with the invention, the event-streamed spectrum imaging treats all signal sources as events allowing the concurrent collection of signals from multiple sources that include, but are not limited to electron and spectral sources. FIG. 1 is a diagram illustrating the environment in which the method of this invention is conducted. A scan generator 101 acquires data concurrently over the area of interest. The data consists of signal events for every pixel position forming pixel events. A pixel event can also include auxiliary events related to a pixel position. Auxiliary events can include parameters that help the host in extracting information from the event stream for visualization and processing. Examples of auxiliary events include, but are not limited to dwell time, x-ray count rate and other data collection parameters. An ESSI module 102 as will be explained in greater detail hereafter, formats all the events into packets and queues the packets into a data stream to be transported 103 directly or over any network interface to the host 104 for further processing. This is done through programming readily apparent to those of ordinary skill once the functions are known.

A data stream transport 103 is then performed using any interface standard and communication protocol. A host 104 which can be any computing device with sufficient storage capacity and may include a display is provided. Examples of this include, but are not limited to, computers, devices with general-purpose or special-purpose processors, pre-processing units, digital signal processors, servers, routers, printers, handheld devices.

FIG. 2 illustrates a conventional scan generator used for the concurrent collection of signals from electron, x-ray and ion sources. A scan generator 201 generates an analog x,y raster over an area of interest on sample 209. The analog signals associated with the x,y raster are applied to a differential or single-ended analog input 205. Current or voltage amplifiers 206 are used to amplify the output signal of analog input 205 to meet the drive characteristics of scan coils or electrostatic plates 207 that move a primary electron or ion beam 208 over a sample 209. Other forms of scan generation such as specimen stage scanning can similarly be applied as will be readily apparent to those of ordinary skill. Sample 209 can be, for example, an integrated circuit wafer that requires manufacturing defect analysis to be performed. The numerals in sample 209 indicate the spatial location on the sample where the primary beam 208 is positioned as decided by the x,y raster. Various types of signals are produced from the interaction of the primary beam 208 with the sample 209 that include, but are not limited to, secondary electrons, backscattered electrons, transmitted electrons, cathodoluminescence, x-rays, induced current, Auger electrons and ions, as will be readily apparent to those of ordinary skill. A detector 210a which is used for secondary or backscattered electrons consists of a scintillator/photomultiplier that converts electrons to photons that are then converted into an electrical signal that is measure by amplifier 211a. Detectors 210b for transmitted electrons and 210d for cathodoluminescence employ a similar design to the secondary/backscattered electron detector 210a. Amplifiers 211b for transmitted electrons and 211d for cathodoluminescence employ a similar design to the amplifiers 210a for secondary/backscattered electrons. A detector 210c is used for absorbed current and uses a low current amplifier 211c. X-ray detector 210e and amplifier 211e usually consist of a photodiode and a charge-sensitive preamplifier/matched filter respectively to detect and measure the energy of x-rays emitted by sample 209. Other signals can be produced and for clarity are represented by 210f along with the associated signal amplifier 211f. These additional signal sources can include, but are not limited to, Electron Beam Induced Current (EBIC), Auger electron spectrometer, Electron Energy Loss Spectrometer (EELS), Time-of-flight mass spectrometer. Electronic signals at amplifiers 211a to 211f are presented in a form that can be measured by a scan generator 201 while dwelling on every x, y pixel position. The scan generator 201 acquires data concurrently from all signal sources/events 211a to 211f for every pixel position over the area of interest creating pixel events. Each x, y raster over an area of interest on sample 209 constitutes one frame of pixel events. Pixel events are formatted into packets by pixel event assembler 202 and streamed directly or over any network interface 203 to a host 204, where the event stream is buffered and stored for use in display and processing.

As may be more fully appreciated, it is important to format the collected data (i.e. signal events, x,y scan positions and scan frame) into the components that are assembled into packets that can be streamed. This allows concurrent signal collection to be achieved because it provides an easy to handle structure for transport, storage, processing and display of the large volume of data resulting from collection of all signal sources.

The invention described herein is not limited to spectrum imaging, i.e., the scanning for a "boxed" area to form an image. As will be readily apparent to those of ordinary skill, since signal collection is synchronized to x, y positions, the scan beam can be directed to any portion or vector to maintain the signal collection synchronized. In one example, an x, y raster is not limited to the same number of x pixels for each y line. The area of interest can be irregular and only the area of interest is scanned. In other words, the area of interest need not be a box. It can take any shape, including being collapsed to a line or point, as is clear to those of ordinary skill from the remaining discussion.

FIG. 3 illustrates a generalized packet structure formed by the method and system of the invention. The packet structure consists of components that may include a component signaling the start of data stream 301, y position components 302a-302b that include event data corresponding to that y position, x position components 303a-303b that include event data corresponding to that x position and a component signaling the end of data stream 304. The start of data stream 301 and end of stream 304 components allow processing modules to sense the start and end of an event stream that represents a spectrum image collection. The position components 302-303 describe a spatial location provided in the form of an x, y pixel position and temporal location which is provided in the form of a frame number. The spatial location described provides position information to processing modules regarding where in the image the pixel events have been collected. The temporal location provides time information to processing modules regarding when the pixel events are collected. Including both spatial and temporal components completely describes the event stream and enables processing modules to correlate pixel events in both position and time.

In this illustration, the x position components 303a-303b also includes the actual signal events. Other packet structures are possible and FIG. 3 illustrates one such structure that yields an efficient organization with minimal replication of information.

In FIG. 3, an event stream is illustrated with the main components of the packet structure described by SOS 301, Y-POSITION 302a and 302b, X-POSITION 303a and 303b and EOS 304. The stream sequence begins with a start of scan component SOS 301. The SOS can include information including but not limited to the packet format and version, the initial collection parameters such as the image size and signal dwell times. The SOS component completely describes the event stream organization such that a processing module can correctly decode the components that follow in the event stream. With respect to a frame of pixel events, Y-POSITION 302a and Y-POSITION 302b include data common to all the pixels on the respective lines that they represent in a particular frame. X-POSITION 303a and X-POSITION 303b include data associated with the respective pixels on a particular line in a particular frame. So, in this illustration, Y-POSITION 302a represents the first line in a particular frame followed by X-POSITION 303a and X-POSITION 303b representing two pixels on that line. Once all the pixels on the line starting with Y-POSITION 302a are represented in the packet structure, the next line in the frame is introduced into the packet starting with Y-POSITION 302b followed by the respective X-POSITION component of each pixel on the line. This sequence continues until a signal indicating end of scan is received by the pixel event assembler 202 from the scan generator 201 of FIG. 2. At this point, the end of stream component EOS 304 is created to signal the end of collection.

FIG. 4 is an illustration of the Y-POSITION component of the packet structure of FIG. 3. As shown in FIG. 4, Y-POSITION 401 can include, but is not limited to, line synchronization flags (SYNC) 402, line identification and processing information (INFO) 403 and spatial and temporal position information (POSITION) 404. SYNC 402 is used to signal to the host to start decoding the upcoming event data as part of a new line in a frame. INFO 403 consists of processing information particular to the new line that can include, but is not limited to, information used to identify the upcoming event data acquired for the line. POSITION 404 can include spatial and temporal position information from where decoding of event data for a pre-determined set of pixel positions starts. The spatial position is provided as an x, y pixel position and the temporal position is usually the current frame number or a time stamp.

FIG. 5 illustrates the X-POSITION component of the packet structure of FIG. 3. As shown in FIG. 5, X-POSITION

501 can include, but is not limited to, current x pixel position X-VALUE 502, event data 503a to 503b, 505a to 505b and auxiliary data 504a to 504b. X-VALUE 502 is provided in terms of (x, y) spatial coordinates. Event data 503a to 503b and 505a to 505b related to a pixel position can include data acquired from all signal sources 211a to 211e using the scan generator 201 of FIG. 2. Examples of acquired event data are electron and spectral data. Auxiliary data 504a to 504b can include parameters that help in decoding and processing of event data 503a to 503b and 505a to 505b at the host 204 of FIG. 2. Examples of auxiliary data include, but are not limited to, signal source specific data collection parameters like dwell time and count rate.

The following alternatives include a part of the scope of the modifications that can be applied to the components that make up the packet structure as illustrated by FIGS. 3, 4 and 5.

One alternative is to include all information that is constant for the rest of the incoming data in the event stream in the field INFO 403 of FIG. 4. Any parameters that change on a pixel-by-pixel basis can be supplied as auxiliary data in the fields 504a to 504b along with the acquired event data 503a to 503b, 505a to 505b for the current pixel position represented by X-POSITION 501 in FIG. 5.

Another alternative is to wholly or partly interlace the INFO field 403 in FIG. 4 with event data 503a to 503b and 505a to 505b in X-POSITION field 501 in FIG. 5. This could depend on whether some contents of the INFO field 403 change for some pre-determined sets of pixel positions.

INFO 403 in FIG. 4 can also be assembled and sent as a separate packet prior to sending the event stream if certain parameters on host 204 in FIG. 2 need to be set up before the event stream arrives.

As shown in FIG. 6, it is possible to send a start of frame SOF 601 component with an embedded current FRAME NUMBER 603 and INFO field 604 with processing information related to the current frame, at the beginning of every frame with frame synchronization flags SYNC 602, making it useful in multicasting where the event stream is transmitted to multiple hosts that correctly synchronize with the start of a frame to aid data extraction from the event stream for display and processing. This way there is no need to restart the collection for every host that becomes connected to the transport interface.

EOS 304 in FIG. 3 can also be used to indicate the end of one frame of data and the beginning of the next, instead of indicating the end of data acquisition.

FIG. 7 illustrates an alternate format in which the event stream may need to be broken up into several smaller streams of data if scan generator 201 of FIG. 2 acquires more event data than host 204 of FIG. 2 can handle. In that case, all the smaller event streams might need a SOF component 701 at the beginning of each sub-stream 702 and an EOS component 703 at the end of each sub-stream 702 indicating to host 204 of FIG. 2 that all the streams are part of the same acquisition. Here, EOS components 703a and 703b would signal end of transport of a sub-stream instead of end of data acquisition.

FIG. 8 is a flow diagram illustrating the steps performed by event-streamed spectrum imaging according to a preferred embodiment of the invention. FIG. 8 is explained with reference to FIGS. 2 and 3. In FIG. 8, multiple frames of pixel events are formatted into a single event stream. The method starts with block 801 where the scan generator 201 starts and packetizer 202 queues the SOS component 301.

In block 802, packetizer 202 checks the spatial information for start of a new line in a frame. Packetizer 202 receives the x, y pixel coordinates as spatial information from scan generator 201.

In block 803, packetizer 202 queues a line header composed of a Y-POSITION 302 component containing processing information for the current line. The header consists of, but is not limited to, line synchronization flags, spatial x, y pixel coordinates corresponding to the first pixel on the line being dwelled on and a temporal component which is usually a number indicating the frame of pixel events being queued.

In block 804, packetizer 202 queues pixel header composed of the first field of a X-POSITION 303 component containing processing information for the current pixel. The header consists of, but is not limited to, a number indicating the pixel position on the current line and processing information for the event data related to the pixel position.

In block 805, packetizer 202 queues the fields of a X-POSITION 303 component containing electron data acquired through scan generator 201 for the current pixel position. By the term "electron data" is meant signals acquired from sources like secondary, backscattered and transmitted electron sources.

In block 806, packetizer 202 queues the fields of a X-POSITION 303 component containing auxiliary data acquired through scan generator 201 for the current pixel position. Examples of auxiliary data include, but are not limited to, signal source specific data collection parameters like dwell time and count rate.

In block 807, packetizer 202 queues the fields of a X-POSITION 303 component containing spectral data acquired through scan generator 201 for the current pixel position. By the term "spectral data" is meant signals like x-rays that are detected when the primary beam 208 strikes the sample 209 at the spatial location associated with the current pixel position and converted into the appropriate electronic signal using an x-ray detector and charge sensitive preamplifier respectively before being sent to scan generator 201 for acquisition.

In block 808, packetizer 202 repeats the process sequentially for every pixel until scan acquisition is complete where upon a EOS 304 component is queued.

The above description is included to illustrate the operation of the preferred embodiment and is not meant to limit the scope of the invention. From the above discussion, many variations will be apparent to one skilled in the relevant art that would yet be encompassed by the spirit and scope of the invention.

What is claimed is:

1. A method for conducting event-streamed spectrum imaging, comprising:
    generating an analog x, y raster scan over an area of interest on a sample with a scan generator to acquire pixel events from individual pixel positions;
    concurrently, detecting a plurality of different types of signals from different signal sources from every pixel position which are generated by the scan from interaction of the raster scan with the sample, and with pluralities of different signals detected registered to every pixel position;
    converting the detected signals into electronic data signals for every x, y position and scan frame from all signals generated by the scan;
    formatting the electronic data signals into packets and streaming said packets over an interface to a host as an event stream; and buffering and storing the event stream in the host for use in display of and processing of information acquired about the sample.

2. The method of claim 1, wherein the packets are assembled as components, comprising:
start of stream components signaling the start of a stream, y position components including event data corresponding to specific y positions, x positions components including event data corresponding to specific x positions, and end of stream components for allowing signaling the end of the stream.

3. The method of claim 2, wherein said x position components and y position components are configured for providing information about a spatial location indicating where the image pixel events have been collected.

4. The method of claim 2, wherein said x position components and y position components are configured to include a frame number for providing information about a temporal location indicating when the image pixel events have been collected.

5. The method of claim 2, wherein said y position components comprised live synchronization flags for signaling the host to start decoding upcoming event data as a new line in a frame, line identification and processing information including information for identifying upcoming event data and spatial and temporal position information from where decoding begins.

6. The method of claim 2, wherein said x position components comprise x pixel position in x, y spatial coordinates and event data related to pixel position including data from sources.

7. The method of claim 2, further comprising breaking a stream into multiple streams if more event data is acquired than a host can handle for a specific stream.

8. The method of claim 1, wherein said plurality of different types of signals comprises secondary electrons, backscattered electrons, transmitted electrons, cathodoluminescence, x-rays, induced current, Auger electrons and ions.

9. The method of claim 1, wherein said raster scan is an electron beam scan, ion beam scan or specimen stage scan.

10. A system for conducting event-streamed spectrum imaging, comprising:
means for generating an x, y raster scan over an area of interest on a sample with a scan generator to acquire pixel events from individual pixel positions;
means for concurrently detecting a plurality of different types of signals from different signal sources from every pixel position which are generated by interaction of a raster scan with a sample, and with pluralities of different signals registered to every pixel position;
means for converting detected signals into electronic data signals for every x, y position and scan frame from all signals generated by a scan;
means for formatting the electronic data signals into packets and for streaming the packets over an interface to a host as an event stream; and
means for buffering and storing the event stream in the host for use in display of and processing of information acquired about a sample.

11. The system of claim 10, further comprising means for assembling said packets as components comprising:
start stream components for signaling the start of a stream; y position components including event data corresponding to specific y positions; x position components including event data corresponding to specific x positions; and end of stream components for allowing signaling the end of a stream.

12. The system of claim 11, wherein said x position components and y position components are configured for providing information about a spatial location indicating where the image pixel events have been collected.

13. The system of claim 11, wherein said y position components comprise live synchronization flags for signaling the host to start decoding upcoming event data as a new line in a frame, line identification and processing information including information for identifying upcoming event data and spatial and temporal position information including spatial and temporal position information from where decoding begins.

14. The system of claim 11, wherein said x position components comprise x pixel position in x, y spatial coordinates and event data related to pixel position including data from sources.

15. The system of claim 11 further comprising means for breaking a stream into multiple streams if more event data is acquired than a host can handle for a specific stream.

16. The system of claim 10, wherein said scan generator is of a type wherein the different types of signals generated comprise secondary electrons, backscattered electrons, transmitted electrons, cathodoluminescence, x-rays, induced current, Auger electrons and ions.

17. The system of claim 10, wherein said x position components and y position components are configured to include a frame number for providing information about a temporal location indicating when the image pixel events have been collected.

18. The system of claim 10, wherein said means for generating an x, y raster scan comprises an electron beam scan, ion beam scan or specimen stage scan.

* * * * *